United States Patent Office 2,938,896
Patented May 31, 1960

2,938,896
AZO DYESTUFFS

Albert F. Strobel, Albany, and William W. Williams, New York, N.Y., and Anatole Wowk, Easton, Pa., assignors to General Aniline & Film Corporation, New York, N.Y., a corporation of Delaware No Drawing. Filed Dec. 28, 1955, Ser. No. 555,745

7 Claims. (Cl. 260—151)

The present invention relates to the production of novel azo dyestuffs devoid of solubilizing groups such as sulfonic acid and carboxylic acid groups, having the formula

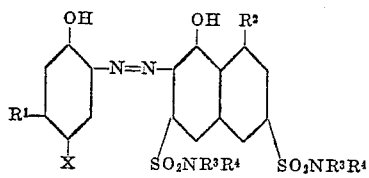

wherein $R^1$ is selected from the group consisting of nitro, amino, acylamino, alkylsulfonylamino, and arylsulfonylamino; $R^2$ is selected from the group consisting of amino, acylamino, alkylsulfonylamino, and arylsulfonylamino; $R^3$ and $R^4$ are selected from the group consisting of H, lower alkyl, lower hydroxyalkyl, and when taken together, part of a heterocycle; and X is selected from the group consisting of H, chloro and bromo; and the metal complexes of such dyestuffs.

Azo dyestuffs derived from the known coupling components and diazo components containing sulfamyl substituents are well known in the prior art. Such dyestuffs are usually employed in metallized form and generally contain free sulfonic acid groups, the function of which is principally to impart some degree of water solubility when dyeing wool, nylon and similar fibrous material. However, most dyestuffs having free sulfonic acid groups have the disadvantage that they do not exhaust well from a neutral dyebath. When they are applied from a weakly acidic dyebath, the sulfonated metallized monoazo dyestuffs often produce unlevel dyeings. Further, the wash fastness and light fastness properties of dyeings made with these dyestuffs have not been found to be completely satisfactory. The instant invention is based upon the discovery that dyestuffs devoid of carboxylic and sulfonic acid groups of the above formula have surprisingly improved properties rendering them highly desirable and superior for commercial use. They are characterized by excellent light- and wash fastness on wool and nylon, in addition to having superior level dyeing properties. They are readily applied to wool or nylon from a neutral or weakly acidic dyebath. Dyestuffs within the above formula have the greenest-blue shades on wool and nylon of monoazo dyes heretofore known, which shades in addition have superior fastness to light and/or washing. Such greenish-blue shades cannot be obtained by mixing.

The above-defined dyestuffs and methods for their provision constitute the objects and purposes of the instant invention.

The dyestuffs of this invention may be readily prepared in known manner by diazotizing a 5-nitro-2-aminophenol having the formula

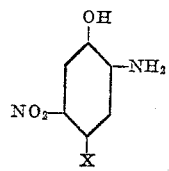

wherein X has the values given above, and coupling the diazotized compound with a coupling component having the formula

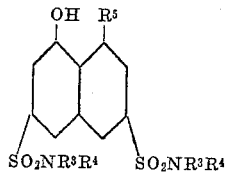

wherein $R^3$ and $R^4$ have the values given above and $R^5$ is selected from the group consisting of acylamino, alkylsulfonylamino and arylsulfonylamino. It has been found that coupling components wherein $R^5$ is $NH_2$ do not yield the desired results, probably due to its influence in directing coupling in ortho position thereto, whereby a mixture of products is obtained. Dyestuffs of the above formula wherein $R^2$ is $NH_2$ are obtained by hydrolysis of the $R^5$ group subsequent to coupling. Dyestuffs of the above formula wherein $R^1$ is amino, acylamino, alkylsulfonylamino and arylsulfonylamino are obtained by reduction of the nitro group in the product of the above coupling reaction, followed if desired by acylation or by reaction with an alkylsulfonyl chloride or arylsulfonyl chloride.

Coupling components operative in the instant invention, and their methods of preparation, are also disclosed in our copending application Serial No. 530,616, filed August 25, 1955. For example, 1-acetylamino-3,6-disulfonyl chloride-8-naphthol may be reacted with ammonia or a suitable primary or secondary base, such as dimethylamine, ethylamine, isopropylamine, ethanolamine, diethanolamine, butylamine, morpholine, piperidine, and the like. Other 1-acylamino, -alkylsulfonylamino and -arylsulfonylamino-3,5-sulfamyl-8-naphthols operative in the instant invention may be prepared in similar manner. Thus, $R^5$ may represent acetylamino, propionylamino, butyrylamino, benzoylamino, substituted benzoylamino, methylsulfonylamino, ethylsulfonylamino, benzenesulfonylamino, substituted benzenesulfonylamino, and the like. In the above formulae, $R^3$ and $R^4$ may be the same or different, and may represent H, lower alkyl such as methyl, ethyl, propyl, isopropyl, butyl, and the like, hydroxyalkyl such as hydroxyethyl, hydroxypropyl, hydroxybutyl and the like, and, when taken together, morpholino, piperidino, and the like. It will be understood that the $R^1$ group in the dyestuffs of this invention may represent the same or different acylamino, alkylsulfonylamino, and arylsulfonylamino groups as $R^5$.

The azo dyestuffs of the above formula may desirably be treated with an agent yielding metal in known manner in acid, neutral or alkaline media with or without the use of pressure and/or elevated temperatures. As substances yielding metal, there may be used for example metallizing agents yielding metals having atomic weights of from 52 to 66, e.g. copper, nickel, iron, cobalt, and especially chromium. These agents may be applied in the form of their oxides, hydroxides or salts, as for example, with inorganic or organic acids such as hydrochloric, sulfuric, hydrofluoric, formic, acetic, tartaric, salicylic, or the like. The metallizing agent may be used alone or in the presence of an additional substance which may or may not form a complex compound with the metallizing agent, as for example, ammonia, pyridine, ethylene diamine, ethanolamine, formamide, formic acid, acetic acid, oxalic acid, aliphatic and aromatic hydroxy-containing compounds such as alcohol, glycerin, aliphatic hydroxy carboxylic acids such as tartaric, lactic and citric acids and the like, aromatic hydroxy carboxylic acids such as salicylic acid and the like, sugars, cellulose derivatives, phenols, tannins and lignins and the like, soluble salts of sulfonic acids and carboxylic acids of the aliphatic, aromatic and hydroaromatic series, inorganic metal, alkali metal and alkaline earth metal salts, oxides and hydroxides and the like. Dispersing agents, solvents and other assistants may also be employed in the metallizing process.

The metallization may be conducted with one or several metallizing agents simultaneously or successively to yield mixed metalliferous complex azo compounds in accordance with this invention. The metallizing agent may be applied in such manner that the resulting product is one or a mixture of complex compounds of the azo dyestuff containing less than one atom, or one atom, or more than one atom of metal. Thus, the resulting metalliferous complex compound may represent the complex union of one atom of metal with from one-half to one or two or more molecules of the azo dyestuff, depending upon the valence and complex-forming characteristics of the metal, the reaction conditions and the like.

It will be readily understood that in the production of the dyestuffs of this invention as above described, diazotization and/or coupling and/or metallization may be carried out in substance, on a substratum, or in situ. These dyestuffs may be employed for coloring (dyeing, pigmenting, etc.) in bulk, on the fiber, and the like. Excellent results are obtained when applying them from a neutral or slightly acid aqueous bath to wool or nylon. These dyestuffs may also be employed for dyeing other material such as silk, leather, mixed fibers, natural or synthetic materials in bulk, film or fiber form such as cellulose esters and ethers, Orlon, Dacron, Dynel, Acrilan, Aralac, and the like. They may also be employed for coloring or pigmenting natural or artificial resins and plastics in bulk, organic solvents, stains, varnishes, lacquers, and the like.

The following examples, in which parts are by weight unless otherwise indicated are illustrative of the instant invention and are not to be regarded as limitative. Unless otherwise indicated, parts by weight are in grams and parts by volume are in cc.

*Example 1*

Preparation and application of the dye:

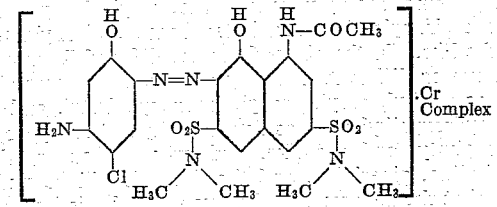

(1) Preparation of the coupler intermediate 1-acetylamino-3,6-di(N,N-dimethylsulfamyl)-8-naphthol was carried out in a manner similar to that described in part 1, Example 1 of our said copending application.

(2) Diazotization of the amine: 10.95 g. of 4-chloro-5-nitro-aminophenol (=4.0/69 moles, 90.5% mol. wt.=188.6) was dissolved in 40.0 mls. water and 6.5 mls. sodium hydroxide 40% (wt./vol.). There was added 13.5 mls. sodium nitrite 30% (wt./vol.). The material was cooled to 13° C. This solution was dripped, over a 45 minute interval, into 60 mls. ice-water and 11.3 mls. conc. hydrochloric acid (38%), together with 4.0 mls. glacial acetic acid. The material was back-titrated with 3.4 mls. sulfamic acid to destroy excess nitrite. Thus, 3.85/69 moles of diazo was formed.

(3) Coupling: 26.5 g. 1-acetylamino-3,6-di-(N,N-dimethylsulfamyl)-8-naphthol (=4.81/69 moles, mol. wt.=415.5) was dissolved in 100 mls. pyridine upon heating to 60° C. The material was cooled to 15° C., and the diazo slurry was added to the coupler at 15°–20° C. The reaction mixture became thick, pH=5.9, but thinned out somewhat on stirring for 10 minutes. The test for free diazo (resorcinol) was positive at this point. There was added 25 mls. glacial acetic acid, the material was heated at 40° C. on a steam bath. The test for coupling with resorcinol became negative, the pH 5.5, volume was 280 mls. The material was stirred an additional ½ hour, allowing temperature to drop to 25° C., whereupon there was added 280 mls. water. The slurry was stirred 15 minutes, then filtered. The filter cake was washed with 250 mls. water. The presscake containing the unmetallized dye weighed 98.6 gms.

(4) Chroming: The wet dye cake above was charged into a 400 ml. beaker set up on a steam bath with thermometer and stirrer. There was added 150 mls. formamide, the product was heated to 95° C. to complete solution. There was then added 11.6 g. chromium formate paste (13.02% Cr,=2.0/69 gm. atoms Cr). The material was stirred at 95°–98° C. for 3 hours, allowed to cool overnight. The material was re-heated to 98° C., poured into 750 mls. water. There was added 96 gms. salt, the slurry was stirred 4 hours, then filtered. The cake was washed with 100 mls. aqueous salt (5% wt./vol.) solution to give the ammonium salt of the chrome complex of the dye having the formula:

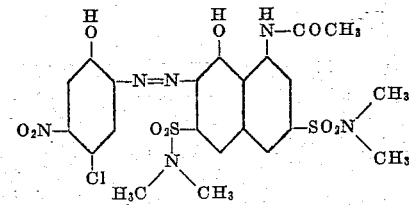

(5) Reduction of the —NO₂ group: The presscake above was reslurried in water to a volume of 800 mls. The material was heated to 95° C., there was added 11.6 mls. potassium hydroxide (56% wt./vol.) and 160 mls. pyridine. The material completely dissolved upon adding the pyridine. There was added at 95° C. 32.0 g. of sodium sulfide monohydrate (9.24/69 moles) dissolved in 60 mls. water. The material was heated at 95° C. for 45 minutes. After this the material was allowed to cool. To the slurry was added 47 gms. of sodium bicarbonate, lowering the pH from 12.3 to 9.0. The dye precipitated, was stirred 4 hours, filtered, washed with water, and dried. Dry wt.=24.1 gms. of the sodium salt of the desired chrome complex dyestuff.

(6) Dispersion: A 10.0 gm. sample of the above dry dyestuff was kneaded for 3 hours in a paddle type kneading mixer with 10.0 gms. of the formaldehyde condensation product of naphthalene-2-sodium sulfonate (Tamol NNO) in the form of a thick paste by intermittent addition of small amounts of water. After this kneading operation, the product was dried by applying steam to the mixer, then the dry powder was discharged and hammermilled.

(7) Dyeing: 0.4 gm. of the dispersed powder was dissolved in 300 mls. water. A 10 gm. piece of wool cloth was added. The dyebath was raised to 100° C. over a 45 minute interval, agitating the cloth in the liquor in the meantime. The temperature of the bath was maintained at 100° C. for an additional hour with continued agitation of the wool, after which the material was removed, rinsed, and dried. A very level dyeing was obtained with very good exhaust of the dyebath. The cloth was dyed greenish-blue. The dyed cloth had excellent light- and wash-fastness.

*Example 2*

Preparation and application of the dye:

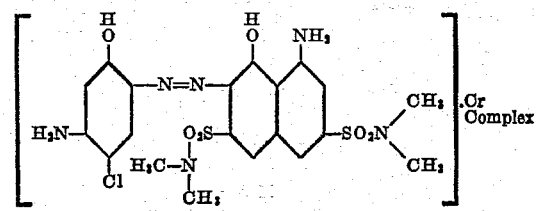

This dye is prepared from the acetylated dye of Example 1 by hydrolysis of the acetyl group with NaOH as follows:

10 gms. (= 1.29/2×69 moles) of the acetyl dye of Example 1 was added to 200 mls. of water, together with 13 mls. of pyridine and 11:5 gms. of sodium hydroxide. The material was stirred at 95° C. for a total of 9 hours. The product was diluted to 600 mls., filtered and dried. Dry wt.=6.3 gms. Dispersion of this dye was carried out as in Example 1.

The dyeing of the product on wool was carried out in the same manner as the dye of Example 1. A greenish-blue shade was obtained, having very good light-fastness and excellent wash-fastness.

*Example 3*

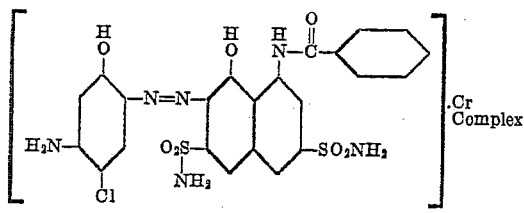

The coupler intermediate 1-benzoylamino-3,6-disulfamyl-8-naphthol was prepared as follows:

942 gms. of H-acid (=150/69 moles, 73.7% mol. wt. =319) was dissolved in 850 mls. water and 244 mls. sodium hydroxide 40% (wt./vol.) at 40°–50° C. There was added 253 gms. of sodium carbonate (2.38 moles) dissolved in 2300 mls. water. Then, over a period of 3 hours with rapid agitation, keeping temperature at 20° C. there was added 335 gms. benzoyl chloride (2.38 moles). At the end of this period there was added 200 mls. sodium hydroxide 40% (wt./vol.). An additional 60 gms. (=0.43 mole) of benzoyl chloride was added dropwise at 20° C. over a 1 hour period with vigorous agitation. The test for free amine, by diazotization and self-coupling, was very faint. The material was stirred an additional 2 hours, then pH was adjusted to 11.5 by addition of NaOH, and the material was heated 2 hours at 80° C. to hydrolyze any O-acetylated material to free naphthol. The material was cooled to 20° C., 200 gms. salt added, the product filtered, pressed down on the funnel, and dried. Dry weight=1013 gms. of 1-benzoylamino - 3,6 - disulfo - 8 - naphthol (85% pure). The formula of this product is

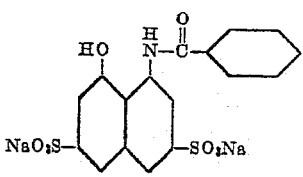

The above product was converted to the di-sulfonyl chloride

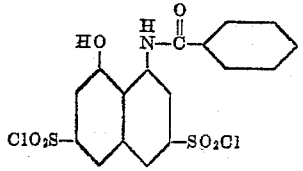

in the same manner that acetyl-H-acid was converted to the disulfonyl chloride as described in said copending application, using equimolecular amounts. Conversion of the above-di-sulfonyl chloride to the disulfonamide was likewise carried out in similar manner, substituting an equal number of moles of ammonia for the dimethylamine used in that preparation.

The diazotization of 4-chloro-5-nitro-2-aminophenol was carried out in the same manner as in Example 1. As coupler an equimolecular amount of 1-benzoyl-amino-3,6-di-sulfamyl-8-naphthol was used in place of the 1-acetyl-amino-3,6-di-(dimethylsulfamyl)-8-naphthol used in Example 1. Coupling was carried out in the same manner as in Example 1. Chroming and reduction of the nitro dye to the free amino dye were also carried out as in Example 1. The final dye of formula illustrated above is water-soluble and therefore does not require dispersion.

0.2 gm. of the above undispersed dye was dissolved in 300 mls. water together with 0.3 gm. of ammonium sulfate. A 10.0 gm. piece of wool cloth was added and the dyebath temperature was raised to 100° C. over a 45 minute interval, agitating the cloth in the liquor in the meantime. The temperature of the bath was maintained at 100° C. for an additional hour with continued agitation of the wool cloth, after which the material was removed, rinsed, and dried. A very level dyeing was obtained, giving a greenish-blue shade with excellent light-fastness and moderate wash-fastness.

*Example 4*

Preparation and application of the dye:

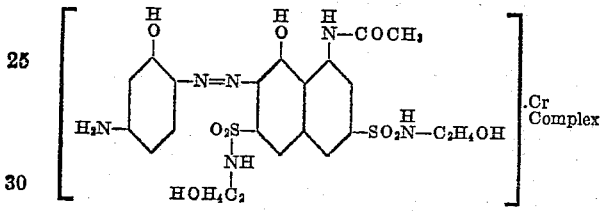

The coupler intermediate 1-acetylamino-3,6-di(hydroxyethylsulfamyl)-8-naphthol was prepared in the same manner as 1-acetylamino-3,6-di-(dimethylsulfamyl)-8-naphthol using an equimolecular amount of ethanolamine in place of the dimethylamine used in the latter.

The diazotization of 5-nitro-2-aminophenol was carried out in the same manner as the diazotization of 5-nitro-4-chloro-2-aminophenol, using equimolecular proportions. Coupling was carried out in the same manner as in Example 1 using an equimolecular proportion of 1-acetylamino-3,6-di-(hydroxyethylsulfamyl) - 8-naphthol in place of the 1-acetylamino-3,6-di-(dimethylsulfamyl)-8-naphthol used in Example 1. The chroming of the dye and reduction of the nitro group to the amino group were carried out exactly as in Example 1. The final dye of formula illustrated above was water-soluble and was applied to nylon and wool exactly as the dye of Example 3 above. A blue shade of excellent light-fastness and good wash-fastness on wool resulted.

*Example 5*

Preparation and application of the dye:

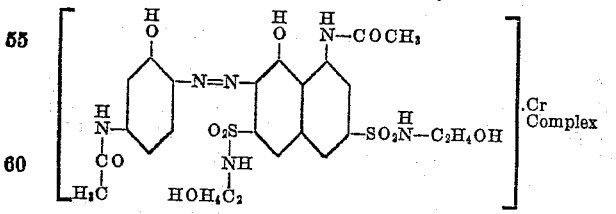

10.0 gms. of the dye of Example 4 was slurried in 150 mls. glacial acetic acid. The material was heated to 94° C., most of the material dissolving. There was added 9.2 mls. of acetic anhydride. The material was heated at 95° C. for 8 hours, then cooled to room temperature. The material was diluted to 400 mls. with water. There was added 50 mls. of sodium hydroxide 40% wt./vol. in a thin stream together with some ice to maintain temperature not over 30° C. The product was stirred 2 hours, filtered. The presscake was dried in a vacuum oven at 75° C. Dry wt.=9.55 g.

Application of this dye to wool was carried out exactly in the manner of the dye of Example 4. A reddishblue shade of good light-fastness and wash-fastness was obtained.

Example 6

Preparation and application of the dye:

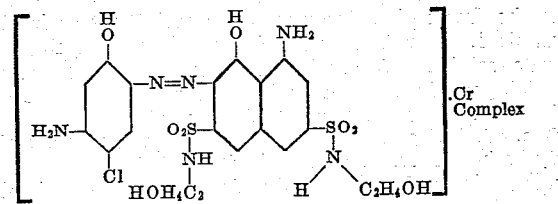

The above dye, in the form of the sodium salt, was prepared by hydrolysis of the acetyl group of the dye of Example 4 using the procedure described in Example 2.

Application of the resulting water-soluble dye to wool (or nylon) was carried out in the manner described for the dye of Example 4 above. A greenish-blue shade was obtained on wool (or nylon), with excellent light-fastness and very good wash-fastness.

Example 7

Preparation and application of the free acid form of the dye of Example 6.

The sodium salt dye of Example 6 above was re-slurried with 5% acetic acid, thereby converting the $-NH_2$ group of the above dye to the ammonium ion. The dye precipitated in the form of the ammonium salt or zwitterion. The resulting precipitate was filtered, dried, and dispersed with an equal weight of naphthalene-2-sulfonic acid (Na salt)—formaldehyde described above. Dyeing was carried out as in the previous examples. Results similar to Example 6 were obtained.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

We claim:

1. A dyestuff devoid of sulfonic acid and carboxylic acid groups selected from the group consisting of complexes of compounds having the formula

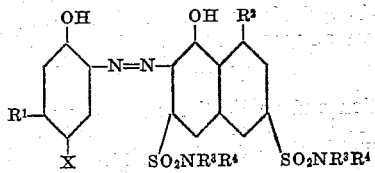

wherein $R^1$ and $R^2$ are selected from the group consisting of amino, lower alkanoylamino, benzoylamino, lower alkylsulfonylamino, and phenylsulfonylamino; $R^3$ and $R^4$ are selected from the group consisting of H, lower alkyl, lower hydroxyalkyl, and when taken together, part of a heterocycle; and X is selected from the group consisting of H, chloro and bromo; with a metal having an atomic weight of from 52 to 66.

2. The chromium complex of a dyestuff as defined in claim 1.

3. A dyestuff having the formula

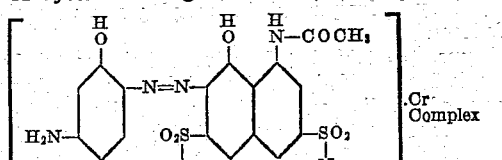

4. A dyestuff having the formula

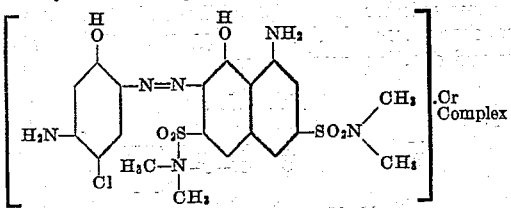

5. A dyestuff having the formula

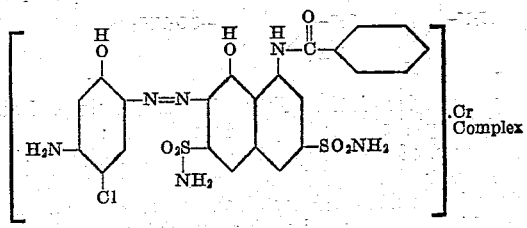

6. A dyestuff having the formula

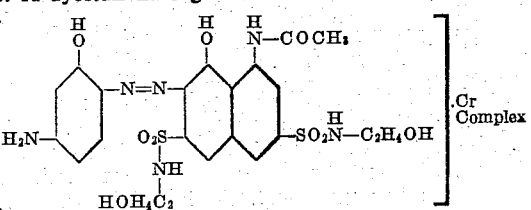

7. A dyestuff having the formula

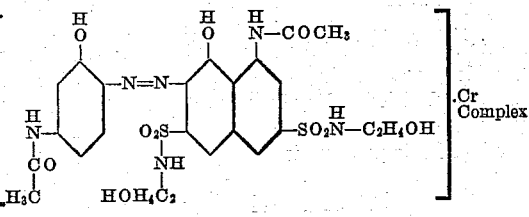

References Cited in the file of this patent

UNITED STATES PATENTS

| | | |
|---|---|---|
| 843,077 | Dressel et al. | Feb. 5, 1907 |
| 1,796,058 | Straub et al. | Mar. 10, 1931 |
| 2,564,243 | Beech et al. | Aug. 14, 1951 |
| 2,610,175 | Widmer et al. | Sept. 9, 1952 |
| 2,723,263 | Kuster et al. | Nov. 8, 1955 |

OTHER REFERENCES

Fierz-David and Blangley: "Dye Chemistry," 1949, pp. 115 and 289.

Venkataraman: "Synthetic Dyes," 1952, p. 540.

Weidmann, C.: "Neutral Premetallized Dyestuffs," American Dyestuff Reporter, March 15, 1954, pp. 167–171.

UNITED STATES PATENT OFFICE

CERTIFICATE OF CORRECTION

Patent No. 2,938,896            May 31, 1960

Albert F. Strobel et al.

It is hereby certified that error appears in the printed specification of the above numbered patent requiring correction and that the said Letters Patent should read as corrected below.

Column 3, line 57, for "5-nitro-aminophenol" read -- 5-nitro-2-aminophenol --.

Signed and sealed this 4th day of April 1961.

(SEAL)

Attest: ERNEST W. SWIDER
Attesting Officer

ARTHUR W. CROCKER
Acting Commissioner of Patents